Patented June 14, 1938

2,120,512

UNITED STATES PATENT OFFICE 2,120,512

SULPHURIC ACID DERIVATIVES OF ORGANIC ACID AMIDES

Erich Rosenhauer, Dusseldorf-Benrath, Germany, assignor to the firm Henkel & Cie, G. m. b. H., Dusseldorf, Germany No Drawing. Original application April 27, 1934, Serial No. 722,686. Divided and this application May 22, 1937, Serial No. 144,312. In Germany May 12, 1933

7 Claims. (Cl. 260—124)

It has been found that a new class of valuable substances may be obtained by treating with sulphonating agents amides having at least one group capable of being sulphonated, of the general formula Z.X.R.NY, where R signifies an aliphatic carbonyl or aliphatic sulfonyl group, X a non-metallic polyvalent atom of the group consisting of oxygen, sulphur and nitrogen, Z an aliphatic, cycloaliphatic or aromatic radical containing not more than 10 carbon atoms and NY an amido group substituted by at least one higher, non-aromatic hydrocarbon radical Y containing at least 6 carbon atoms.

This application is a division of my United States application for United States Letters Patent, Serial No. 722,686, filed April 27, 1934, entitled "Sulphuric acid derivatives of organic acid amides."

For the process according to the present invention, amides, substituted at the nitrogen, of aliphatic oxymercapto or amino carboxylic or sulphonic acids, substituted at the oxygen, sulphur or nitrogen are employed as starting substances. The following general formulae may be proposed for these compounds:

(1) Z.O.R.NY
(2) Z.S.R.NY
(3) Z'.Z''.N.R.NY

The compounds according to Formulae 1 and 2 constitute amides of substituted oxy or mercapto acids, and those according to the Formula 3 constitute amides of secondary or tertiary aminoacids, which may contain the amino-nitrogen combined in any desired manner, for example in secondary, tertiary or ring form. In these derivatives of amides, the organic radicals Z, Z' and Z'' signify aliphatic, cycloaliphatic and aromatic radicals. Suitable radicals are for example the ethyl, β-oxy-ethyl, acetyl, cyclohexyl and phenyl radicals. R represents the radicals of methane, ethane, propane acids and their homologues, such as lauric acid, and also the radicals of the corresponding sulphonic acids, such as ethane, propane and octodecane sulphonic acids. The amido-group NY contains higher aliphatic or cycloaliphatic hydrocarbon radicals. Such radicals are fatty alkyl radicals, such as the decyl and undecyl radical, the dodecyl, tetradecyl and octodecenyl radical, as well as the corresponding radicals of alcohols obtained by the reduction of other soap-forming carboxylic acids, such as resinic acids and naphthenic acids. The said derivatives of amides contain a reactive group capable of being sulphonated. Such groups are free hydroxyl groups and carbon double bonds.

The said reactive amides may be obtained for example by reacting halogen acyl amides, substituted at the nitrogen by a higher aliphatic or cycloaliphatic residue, with alcohols, mercaptans or primary or secondary amines. Thus α, β, γ-dioxypropyl oxylauric-N-cyclohexyl-amide is obtained from α-bromolauric-N-cyclohexyl-amide and the monosodium compound of glycerol, or β-phenoxy-ethane-sulphonic-N-methyldodecyl amide from β-chlorethane-sulphonic-N-methyldodecyl amide and sodium phenolate. Furthermore, tolyl-mercapto-ethane sulphonic-N-hexadecyl-amide is obtained from bromoethane-sulphonic-N-hexadecyl-amide and sodium tolylmercaptan. In a similar manner, anilino-acetic-N-undecyl-amide is obtained from monobromacetic-N-undecyl amide and aniline. Finally, the starting substances for the present process may also be obtained by the reaction of organic oxy, mercapto or amino acids, which are substituted at the oxygen, sulphur or nitrogen by an organic radical, with higher aliphatic or cycloaliphatic primary or secondary amines. In this case the acids are employed as such or in the form of their functional derivatives, such as esters, anhydrides, acid halides, lactones and the like. By this process, for example, phenyl-amino-acetic-N-cyclohexyl-amide is obtained from phenyl-amino-acetic-methyl-ester and cyclohexylamine, and (oxyethoxy)-acetic-N-undecyl-amide is obtained from the lactone of (oxy-ethoxy)-acetic acid and undecylamine.

According to the nature of the organic radicals and the sulphonating agent both true sulphonic acids and also sulphuric esters are formed in treating the amides described with sulphonating agents; some of the starting substances absorb both groups simultaneously. The sulphuric acid radical may enter both the amide group and also the acid group and the organic substituents.

As sulphonating agents are employed: strong sulphuric acid, sulphuric acid containing $SO_3$, $SO_3$ and its additive products with organic compounds, chlorosulphonic acid and the like sulphonating agents, it being expedient to work in the presence of solvents, diluents and dehydrating agents, but in some cases these may be omitted.

The water-soluble products obtained according to the present invention may be employed as soap substitutes, and also in the pharmaceutical and cosmetic industries.

Examples (1) A mixture of the amides of coconut fatty acid is converted into the corresponding amines by Hofmann's reaction. From ethoxyacetic lactone and the amine mixture thus obtained, a mixture of the oxy-ethoxyacetic amides substituted at the nitrogen by higher aliphatic radicals is obtained.

42 parts by weight of the amide mixture are dissolved in 200 parts by volume of ether and 20 parts by weight of chlorosulphonic acid are added at a temperature of 0° to 5° C. with good agitation. Agitation is continued until a test sample of the sulphonation product is clearly soluble in water. After neutralization with soda and working up, the sodium salts of the mixture of acid sulphuric esters of the higher oxy-ethoxyacetic-N-alkylamides are obtained in the form of a white powder which dissolves in water to form clear solutions. The substance is absolutely stable to hard water and exhibits a very good foam-producing and wetting power.

(2) 20 parts by weight of phenoxyacetic-N-cyclohexyl-amide are heated on the water bath for about 2 hours with the same quantity by weight of concentrated sulphuric acid. The reaction product is poured into ice water, is neutralized with soda and salted out with common salt. The resulting sodium salt of the monosulphonic acid of phenoxyacetic-N-cyclohexylamide is, in the dry condition, a powder which dissolves in water to form clear solutions.

(3) 20 parts by weight of a mixture of the amides of phenoxyacetic acid and a mixture of higher aliphatic amines, which have been obtained from the amides of coconut fatty acids by Hofmann's reaction, are heated on the water bath with the same quantity by weight of sulphuric acid for about half an hour. The reaction product is poured into ice water, neutralized with soda and salted out with common salt. The resulting sodium salt of a mixture of sulphonic acids of phenoxyacetic-N-alkylamides is a white powder which dissolves in cold water to form clear solutions having a good foam-producing power.

I claim:

1. An alkali-metal salt of sulphonated oxy-fatty acid-amides which are substituted at the amido group by a higher non-aromatic hydrocarbon radical containing at least six carbon atoms and at the oxygen by a hydrocarbon group containing not more than 10 carbon atoms.

2. An alkali-metal salt of sulphonated oxy-fatty acid-amides which are substituted at the amido group by a higher alkyl radical containing at least 6 carbon atoms and at the oxygen by a hydrocarbon group containing not more than 10 carbon atoms.

3. An alkali-metal salt of sulphonated oxy-fatty acid-amides which are substituted at the amido group by a cycloalkyl radical containing at least 6 carbon atoms and at the oxygen by a hydrocarbon group containing not more than 10 carbon atoms.

4. An alkali-metal salt of sulphonated oxy-fatty acid-amides which are substituted at the amido group by a higher non-aromatic hydrocarbon radical containing at least 6 carbon atoms and at the oxygen by an aromatic radical containing not more than 10 carbon atoms.

5. An alkali-metal salt of sulphonated higher hydroxyethoxyacetic-N-alkylamides.

6. An alkali-metal salt of sulphonated phenoxyacetic-N-cycloalkylamides.

7. An alkali-metal salt of sulphonated higher phenoxyacetic-N-alkylamides.

ERICH ROSENHAUER.